(12) United States Patent
Jo

(10) Patent No.: US 11,603,040 B2
(45) Date of Patent: Mar. 14, 2023

(54) DEVICE AND METHOD FOR CONTROLLING EMOTIONAL LIGHTING OF VEHICLE

(71) Applicants: HYUNDAI MOTOR COMPANY, Seoul (KR); KIA CORPORATION, Seoul (KR)

(72) Inventor: Ho Ssang Jo, Anyang-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 13 days.

(21) Appl. No.: 17/366,536

(22) Filed: Jul. 2, 2021

(65) Prior Publication Data
US 2022/0080884 A1 Mar. 17, 2022

(30) Foreign Application Priority Data
Sep. 15, 2020 (KR) .................. 10-2020-0118605

(51) Int. Cl.
| | |
|---|---|
| B60Q 3/85 | (2017.01) |
| H05B 47/125 | (2020.01) |
| H05B 45/22 | (2020.01) |
| B60Q 3/12 | (2017.01) |
| G06V 20/40 | (2022.01) |
| G06V 20/56 | (2022.01) |
| B60Q 9/00 | (2006.01) |

(52) U.S. Cl.
CPC .............. *B60Q 3/85* (2017.02); *B60Q 3/12* (2017.02); *B60Q 9/005* (2013.01); *G06V 20/46* (2022.01); *G06V 20/49* (2022.01); *G06V 20/56* (2022.01); *H05B 45/22* (2020.01); *H05B 47/125* (2020.01)

(58) Field of Classification Search
CPC ... B60Q 3/12; B60Q 3/60; B60Q 3/85; B60Q 3/208; B60Q 9/005; B60Q 1/2696; H05B 47/125; H05B 45/22; G06V 20/56; G06V 20/59; G02F 1/015; G02F 1/1021
See application file for complete search history.

(56) References Cited

U.S. PATENT DOCUMENTS

| | | | |
|---|---|---|---|
| 7,800,483 B2 * | 9/2010 | Bucher | B60Q 3/80 362/490 |
| 10,137,831 B1 * | 11/2018 | Salter | B60Q 3/62 |
| 2008/0112175 A1 * | 5/2008 | Bucher | B60Q 3/74 362/490 |
| 2016/0357262 A1 * | 12/2016 | Ansari | G08G 1/166 |
| 2019/0228244 A1 * | 7/2019 | Brauer | G06F 3/005 |

(Continued)

FOREIGN PATENT DOCUMENTS

WO WO-2011070640 A1 * 6/2011 ......... G06K 9/00805

*Primary Examiner* — Abdullah A Riyami
*Assistant Examiner* — Syed M Kaiser
(74) *Attorney, Agent, or Firm* — Morgan, Lewis & Bockius LLP

(57) ABSTRACT

A device for controlling emotional lighting of a vehicle allows a driver and a passenger of the vehicle to emotionally view an external landscape through a door glass. Such a device includes: a camera for recording a video of a surrounding region of the vehicle; an emotional lighting device for irradiating light toward the door glass of the vehicle; and a controller for controlling the emotional lighting device to detect a representative color within the video of the surrounding region and irradiate light of a color corresponding to the representative color.

18 Claims, 11 Drawing Sheets

(56) References Cited

U.S. PATENT DOCUMENTS

2019/0228245 A1\* 7/2019 Brauer .................. G06V 20/56
2019/0327124 A1\* 10/2019 Lai ......................... G01S 11/02
2020/0150462 A1\* 5/2020 Cermak ................ G02F 1/0121

\* cited by examiner

DEVICE AND METHOD FOR CONTROLLING EMOTIONAL LIGHTING OF VEHICLE

CROSS-REFERENCE TO RELATED APPLICATION

This application claims the benefit of priority to Korean Patent Application No. 10-2020-0118605, filed in the Korean Intellectual Property Office on Sep. 15, 2020, the entire contents of which are incorporated herein by reference.

TECHNICAL FIELD

The present disclosure relates to a technology that enables a driver and a passenger of a vehicle to emotionally view an external landscape through a door glass.

BACKGROUND

An emotional lighting device that sets a lighting condition of an optimal state based on a regional environmental factor such as a nation, a city, or the like, and selects lighting of the set condition based on a preference of a user has been proposed.

Such an emotional lighting device may include a region selecting device that selects a region of the nation and the city, storage that stores a light intensity, a color temperature, and a wavelength based on the region of the nation and the city for each weather and time slot, a detecting device that counts the weather and the time, a controller that sets the light intensity, the color temperature, and the wavelength based on the region of the nation and the city selected by the region selecting device to suitable for the current weather and time slot counted by the detecting device, and an LED light source driving device that drives red, green, and blue LED light sources based on the light intensity, the color temperature, and the wavelength set by the controller.

Such an emotional lighting device, which is a device for making an indoor atmosphere of a vehicle mild, stores the light intensity, the color temperature, and the wavelength based on the region of the nation and the city for each weather and time slot, and drives the LED light source based on the stored light intensity, color temperature, and wavelength.

The matters described in this background are written to enhance an understanding of the background of the disclosure, and may include matters other than the prior art already known to those of ordinary skill in the field to which this technology belongs.

SUMMARY

The present disclosure has been made to solve the above-mentioned problems occurring in the prior art while advantages achieved by the prior art are maintained intact.

An aspect of the present disclosure provides a device and a method for controlling emotional lighting of a vehicle that shoot a video of a surrounding region using a camera included in the vehicle, detect a representative color within the video of the surrounding region, and irradiate light of a color corresponding to the representative color to a door glass of the vehicle, thereby allowing a driver and a passenger of the vehicle to emotionally view an external landscape through the door glass.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a device for controlling emotional lighting of a vehicle includes a camera that shoots a video of a surrounding region of the vehicle, an emotional lighting device for irradiating light toward a door glass of the vehicle, and a controller that controls the emotional lighting device to detect a representative color within the video of the surrounding region shot by the camera and irradiates light of a color corresponding to the representative color.

In one implementation, the controller may acquire vehicle speed information through a vehicle network.

In one implementation, the controller may determine a time point of irradiation of the emotional lighting device based on the vehicle speed information.

In one implementation, the controller may detect the representative color from a side region video of the video of the surrounding region shot through the camera when the vehicle is stopped.

In one implementation, the controller may detect the representative color from a front region video of the video of the surrounding region shot through the camera when the vehicle is traveling.

In one implementation, the controller may determine a region of interest (ROI) within the front region video based on the vehicle speed information, and detect the representative color within the ROI.

In one implementation, the controller may detect a color with the highest occupancy ratio within the ROI as the representative color.

In one implementation, the controller may detect a portion of a left region of the front region video as the ROI when providing an emotional landscape to a passenger on a left side of the vehicle, and detect a portion of a right region of the front region video as the ROI when providing the emotional landscape to a passenger on a right side of the vehicle.

In one implementation, the device may further include a setting device that receives setting on an operation mode from a user, and an actuator for adjusting an irradiation direction of the emotional lighting device.

In one implementation, the controller may control the actuator such that the irradiation direction is directed toward an upper end of an interior of the vehicle when a warning signal is input from a warning system included in the vehicle, and control the emotional lighting device to irradiate light of a color corresponding to the warning signal.

In one implementation, the controller may control the actuator such that the irradiation direction is directed toward a lower end of an interior of the vehicle when a mood mode is set through the setting device, and control the emotional lighting device to irradiate light of a color corresponding to the mood mode.

In one implementation, the controller may control the actuator such that light of the emotional lighting device reciprocates a predetermined section when a music mode is set through the setting device, and control the emotional lighting device to irradiate light of a color corresponding to the music mode.

According to another aspect of the present disclosure, a method for controlling emotional lighting of a vehicle includes shooting, by a camera, a front region video of the vehicle, detecting, by a controller, a representative color within the front region video, controlling, by the controller, an emotional lighting device to irradiate light of a color corresponding to the representative color, and irradiating, by the emotional lighting device, the light toward a door glass of the vehicle.

In one implementation, the method may include determining a region of interest (ROI) in the front region video based on a vehicle speed, and detecting a color with the highest occupancy ratio within the ROI as the representative color.

In one implementation, the method may include determining a portion of a left region of the front region video as the ROI when providing an emotional landscape to a passenger on a left side of the vehicle, and determining a portion of a right region of the front region video as the ROI when providing the emotional landscape to a passenger on a right side of the vehicle.

In one implementation, the method may include determining a time point of irradiation of the emotional lighting device based on a vehicle speed.

In one implementation, the method may further include adjusting, by the controller, an irradiation direction of the emotional lighting device to an upper end of an interior of the vehicle when a warning signal is input from a warning system included in the vehicle, and controlling the emotional lighting device to irradiate light of a color corresponding to the warning signal, adjusting, by the controller, the irradiation direction of the emotional lighting device to a lower end of the interior of the vehicle when a mood mode is set by a user, and controlling the emotional lighting device to irradiate light of a color corresponding to the mood mode, and adjusting, by the controller, the light of the emotional lighting device to reciprocate a predetermined section when a music mode is set by the user, and controlling the emotional lighting device to irradiate light of a color corresponding to the music mode.

According to another aspect of the present disclosure, a method for controlling emotional lighting of a vehicle includes shooting, by a camera, a side region video of the vehicle, detecting, by a controller, a representative color within the side region video, controlling, by the controller, an emotional lighting device to irradiate light of a color corresponding to the representative color, and irradiating, by the emotional lighting device, the light toward a door glass of the vehicle.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
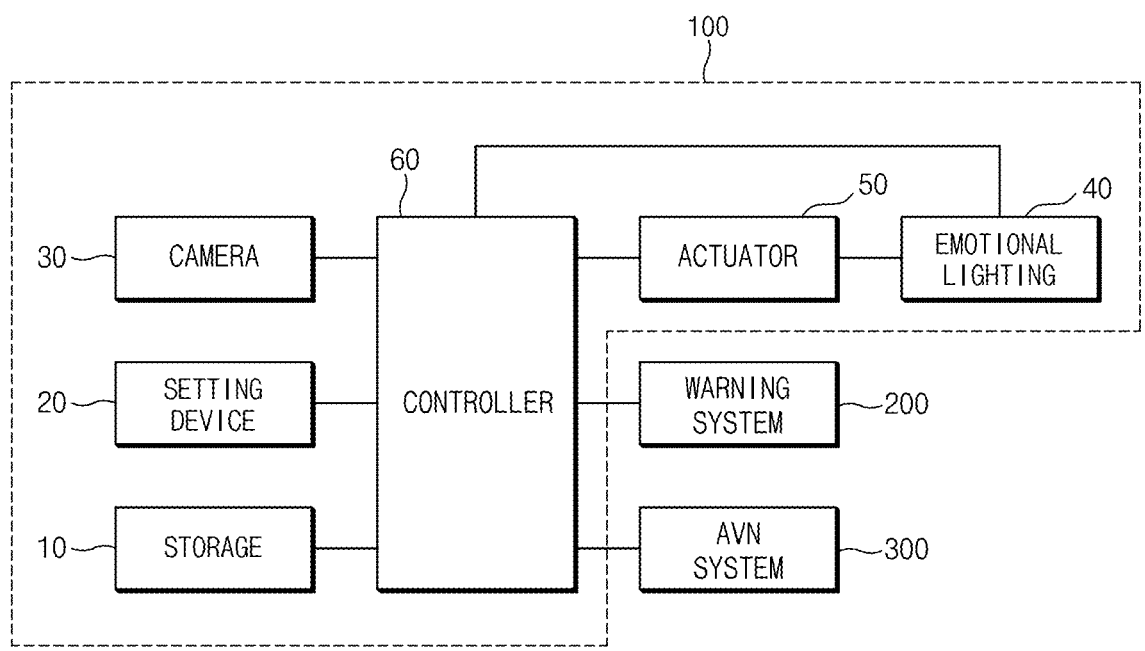
FIG. 1 is a block diagram of a device for controlling emotional lighting of a vehicle according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that teams, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram of a device for controlling emotional lighting of a vehicle according to an embodiment of the present disclosure.

As shown in FIG. 1, a device 100 for controlling emotional lighting of a vehicle according to an embodiment of the present disclosure may include storage 10, a setting device 20, a camera 30, emotional lighting 40, an actuator 50, and a controller 60. In this connection, the components may be combined with each other to be implemented as one component or some components may be omitted based on a scheme for implementing the device 100 for controlling the emotional lighting of the vehicle according to an embodiment of the present disclosure.

Looking at each of the components, first, the storage 10 may store various logics, algorithms, and programs required in a process of shooting a video of a surrounding region using the camera 30 included in the vehicle, detecting a representative color within the video of the surrounding region, and irradiating light of a color corresponding to the representative color to a door glass of the vehicle.

Figure 2:
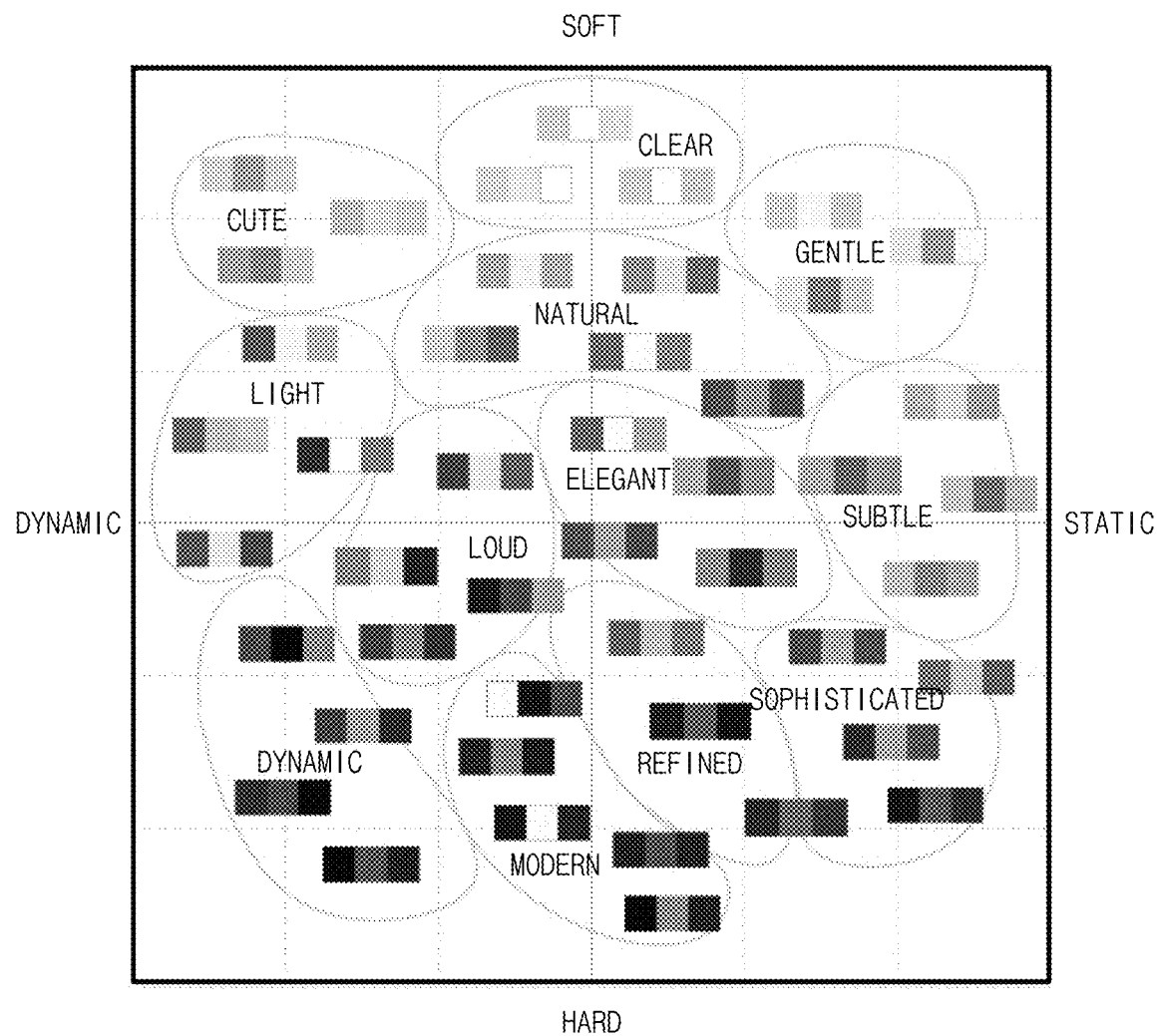
FIG. 2 is an exemplary diagram of a color chip included in a device for controlling emotional lighting of a vehicle according to an embodiment of the present disclosure.

The storage 10 may store a table in which color information (an RGB value) corresponding to each representative color is recorded. In this connection, when matching a color of the emotional lighting 40 to each representative color, a color chip as shown in FIG. 2 may be referred to maximize an effect of the emotional lighting 40. For example, when the representative color is blue, a color of the emotional lighting 40 matching thereto may include at least one of sky blue, royal blue, cerulean blue, midnight blue, aqua blue, and/or marine blue. As another example, a first table may be generated based on a basic color chip, a second table may be generated based on a color chip giving a pastel tone feeling, and a third table may be generated based on a color chip giving an intense feeling.

The storage 10 may store a plurality of tables such that a user may select a color of the emotional lighting 40 that suits a taste thereof. In this connection, different color information may be recorded for the representative color in the plurality of tables. For example, the first table may include at least one of the sky blue and/or the royal blue as the color of the emotional lighting 40 that matches the blue, which is the representative color. The second table may include at least one of the cerulean blue and/or the midnight blue as the color of the emotional lighting 40 that matches the blue, which is the representative color. The third table may include at least one of the aqua blue and/or the marine blue as the color of emotional lighting 40 that matches the blue, which is the representative color.

The storage 10 may include at least one type of recording media (storage media) of a memory of a flash memory type, a hard disk type, a micro type, a card type (e.g., a secure digital card (SD card) or an eXtream digital card (XD card)), and the like, and a memory of a random access memory (RAM), a static RAM (SRAM), a read-only memory (ROM), a programmable ROM (PROM), an electrically erasable PROM (EEPROM), a magnetic RAM (MRAM), a magnetic disk, and an optical disk type.

The setting device 20, which is a module that receives various settings from the user, may include an input device of an audio video navigation (AVN) system 300 as an example.

The setting device 20 may receive setting on whether to operate (turn on/off) an emotional mode from the user. Such an emotional mode may be activated in a safe travel situation as a default mode.

The setting device 20 may receive setting on a mood mode or a music mode set from the user. In this connection, the mood mode refers to a mode that makes an indoor atmosphere of the vehicle mild, or allows the emotional lighting 40 to operate as indoor indirect lighting. The music mode is a mode that irradiates light moving in accordance with music output from the AVN system 300, which may buoy a driver as well as prevent drowsy driving of the driver.

The camera 30 may shoot the video of the surrounding region of the vehicle. Such a camera 30 may include a front camera that shoots a front region video of the vehicle and a side camera that shoots a side region video of the vehicle. In this connection, the side camera may include a left-side camera and a right-side camera.

The emotional lighting 40 is a lighting device capable of irradiating light of various colors under control of the controller 60, which, for example, may be implemented as red green blue (RGB) light-emitting diode (LED) lighting.

Such an emotional lighting 40 may be mounted on an upper end of a door trim of the vehicle to irradiate the light of the various colors toward the door glass or irradiate the light of the various colors toward an interior of the vehicle.

The actuator 50, which is a module that rotates the emotional lighting 40, may adjust an irradiation direction of the emotional lighting 40 under control of the controller 60. Such an actuator 50 may include a step motor (not shown).

The controller 60 may perform overall control such that each of the components may normally perform a function thereof. Such a controller 60 may be implemented in a form of hardware, may be implemented in a form of software, or may be implemented in a form in which the hardware and the software are combined with each other. The controller 60 may be implemented as a microprocessor, but may not be limited thereto.

In particular, the controller 60 may perform various controls in the process of shooting the video of the surrounding region using the camera 30 included in the vehicle, detecting the representative color within the video of the surrounding region, and irradiating the light of the color corresponding to the representative color to the door glass of the vehicle.

The controller 60 may acquire various vehicle information and travel information (e.g., a vehicle speed, a steering angle, and the like) through a vehicle network. In this connection, the vehicle network may include a controller area network (CAN), a controller area network with flexible data-rate (CAN FD), a local interconnect network (LIN), a FlexRay, a media oriented systems transport (MOST), an Ethernet, and the like.

The controller 60 may set the emotional mode as the default mode.

Hereinafter, an operation of the controller 60 will be described in detail with reference to FIGS. 3 to 4.

Figure 3:
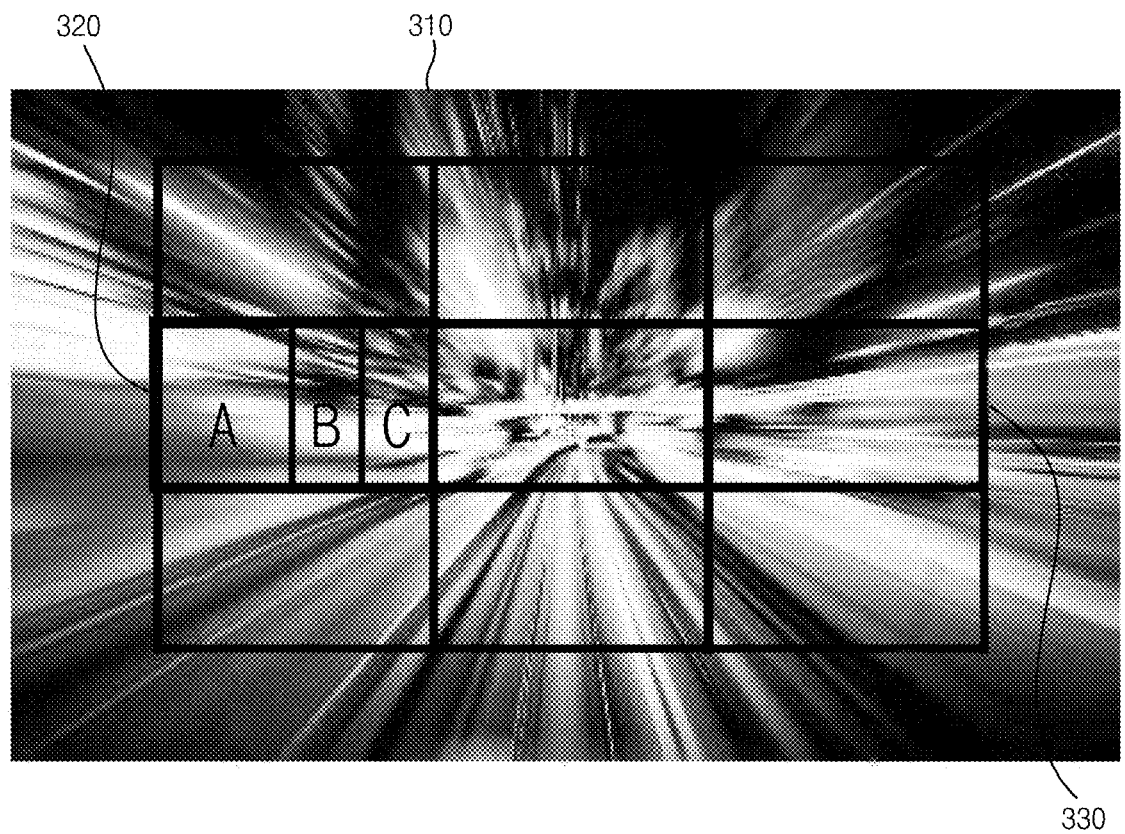
FIG. 3 is an exemplary diagram illustrating a process of detecting, by a controller included in a device for controlling emotional lighting of a vehicle according to an embodiment of the present disclosure, a representative color in a front region video shot by a camera.

FIG. 3 is an exemplary diagram illustrating a process of detecting, by a controller included in a device for controlling emotional lighting of a vehicle according to an embodiment of the present disclosure, a representative color in a front region video shot by a camera.

As shown in FIG. 3, a front region video 310 shot by the camera 30 in a state in which the vehicle is traveling may contain various colors. The controller 60 needs to set a region of interest (ROI) in the front region video 310 to detect a representative color from the front region video 310. In this connection, the ROI may be, for example, a region '320' when providing a service to a passenger on a left side, and may be, for example, a region '330' when providing the service to a passenger on a right side. In FIG. 3, an example of dividing the front region video 310 into 9 regions is described to aid understanding, but the number of regions dividing the front region video 310 may be changed based on an intention of a designer. Hereinafter, the case of providing the service to the passenger on the left side will be described, but the same scheme may be applied to the case of providing the service to the passenger on the right side.

The controller 60 may subdivide the ROI 320 into a first ROI (a region "A"), a second ROI (a region "B"), and a third ROI (a region "C") as an example. This is a measure in consideration of the vehicle speed. For example, the controller 60 may detect the representative color in the region "A" when the vehicle speed is low (e.g., less than 50 kph), detect the representative color in a region in which the region "A" and the region "B" are integrated when the vehicle speed is medium (e.g., greater than 50 kph and less than 80 kph), and detect the representative color in the region 320 in which the region "A", the region "B", and the region "C" are integrated when the vehicle speed is high (e.g., greater than 80 kph and less than 110 kph). In this connection, the representative color may be a color having the highest occupancy ratio in a corresponding region.

As another example, the controller 60 may detect the representative color in the region "A" when the vehicle speed is low (e.g., less than 50 kph), detect the representative color in the region "B" when the vehicle speed is medium (e.g., greater than 50 kph and less than 80 kph), and detect the representative color in the region "C" when the vehicle speed is high (e.g., greater than 80 kph and less than 110 kph).

Eventually, the controller 60 may determine the ROI within the front region video 310 based on the vehicle speed. That is, the controller 60 may select the ROI from the plurality of regions in the front region video 310 based on the vehicle speed. In the above, the embodiment in consideration of the vehicle speed has been described, but the ROI may be determined in the front region video 310 in consideration of both the vehicle speed and a navigation route.

In one example, changing the color of the emotional lighting 40 based on a representative color detected for each frame of the image causes too frequent changes, so that the controller 60 may determine a color having the highest occupancy ratio for frames of the predetermined number as the representative color. In this connection, the number of frames may be determined based on the vehicle speed. For example, as the vehicle speed increases, the number of frames may decrease.

The controller 60 may determine a time point of irradiation of the emotional lighting 40 based on the vehicle speed. This is to match a time point at which a region from which the representative color is detected is reflected in the eyes of the passenger through the door glass. That is, the controller 60 may control the emotional lighting 40 to irradiate the light of the color corresponding to the representative color at the time point at which the passenger views the region from which the representative color is detected through the door glass.

The controller 60 may control the emotional lighting 40 to irradiate the light of the color corresponding to the representative color detected in the above-described scheme to provide an emotional landscape to the driver or the passenger. The result thereof is as shown in FIG. 4 as an example.

Figure 4:
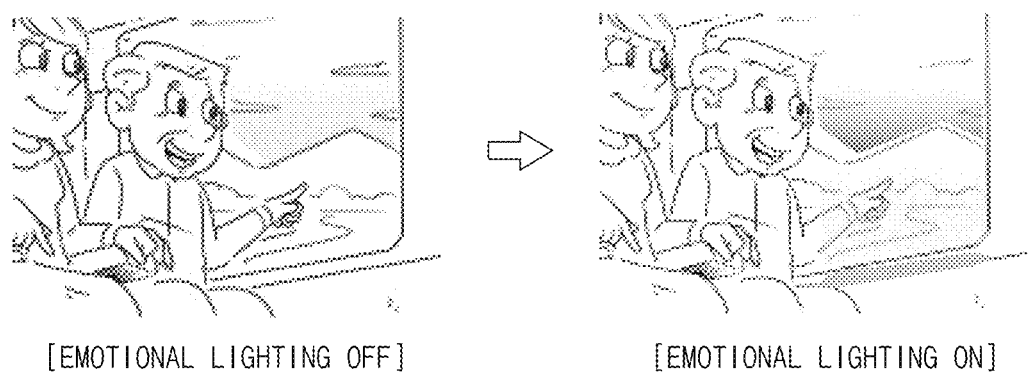
FIG. 4 is an exemplary diagram illustrating a process of controlling emotional lighting by a controller included in a device for controlling emotional lighting of a vehicle according to an embodiment of the present disclosure.

FIG. 4 is an exemplary diagram illustrating a process of controlling emotional lighting by a controller included in a device for controlling emotional lighting of a vehicle according to an embodiment of the present disclosure.

As shown in FIG. 4, in a state in which the emotional mode is deactivated, the passenger views a pristine landscape through the door glass. However, in a state in which the emotional mode is activated, the passenger may view a landscape overlapped with the color of the emotional lighting 40 through the door glass, thereby providing emotional satisfaction to the passenger.

In one example, the controller 60 may detect a representative color from the side region video shot through the side camera of the vehicle, and control the emotional lighting 40 to irradiate light of a color corresponding to the detected representative color in a state in which the vehicle is stopped. In this connection, the controller 60 may detect the representative color from an entire region of the side region video.

Hereinafter, a scheme for the controller 60 to control the actuator 50 will be described in detail with reference to FIGS. 5A to 5D.

Figure 5A:
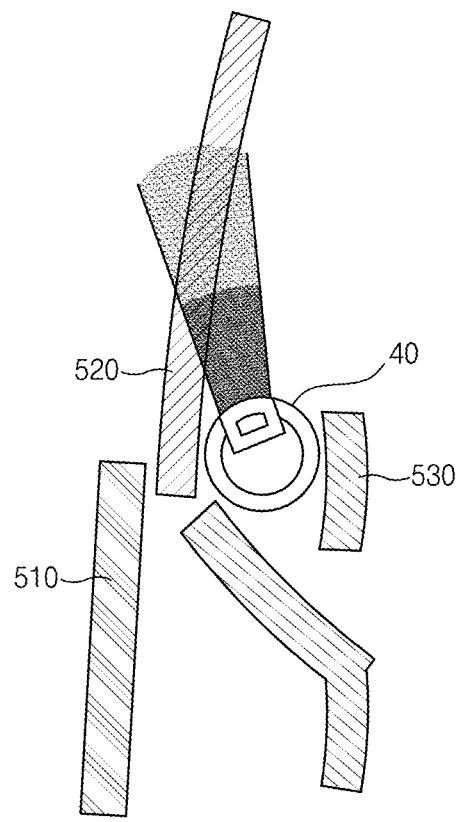
FIG. 5A is a first exemplary diagram illustrating an operation state of an actuator included in a device for controlling emotional lighting of a vehicle according to an embodiment of the present disclosure.

FIG. 5A is a first exemplary diagram illustrating an operation state of an actuator included in a device for controlling emotional lighting of a vehicle according to an embodiment of the present disclosure.

In FIG. 5A, '510' denotes a door, '520' denotes the door glass, and '530' denotes a structure at the upper end of the door trim. The emotional lighting 40 may be mounted at the upper end of the door trim. When the user sets the emotional mode through the setting device 20, or when the controller 60 operates in the default mode (the emotional mode), the controller 60 may control the actuator 50 such that the light irradiated from the emotional lighting 40 faces the door glass of the vehicle.

Figure 5B:
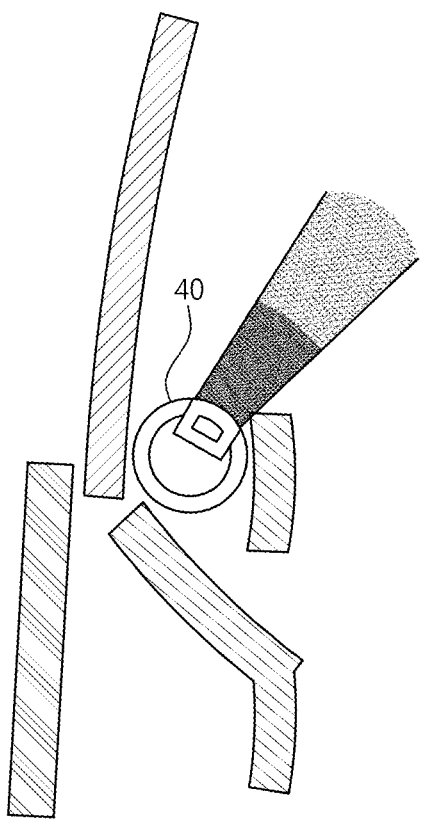
FIG. 5B is a second exemplary diagram illustrating an operation state of an actuator included in a device for controlling emotional lighting of a vehicle according to an embodiment of the present disclosure.

FIG. 5B is a second exemplary diagram illustrating an operation state of an actuator included in a device for controlling emotional lighting of a vehicle according to an embodiment of the present disclosure.

As shown in FIG. 5B, when a warning signal is input from a warning system 200, the controller 60 may control the actuator 50 such that the irradiation direction of the emotional lighting 40 is directed toward an upper end of the interior of the vehicle to warn the driver. In this connection, the controller 60 may control the emotional lighting 40 to irradiate light of a warning color (e.g., red or yellow).

In this connection, the warning system 200 may include at least one of an autonomous emergency braking (AEB), a forward collision warning system (FCW), an adaptive cruise control (ACC), a lane departure warning system (LDWS), a lane keeping assist system (LKAS), a blind spot detection (BSD), a rear-end collision Warning system (RCW), a smart parking assist system (SPAS), and/or an advanced driver assistance system (ADAS).

Figure 5C:
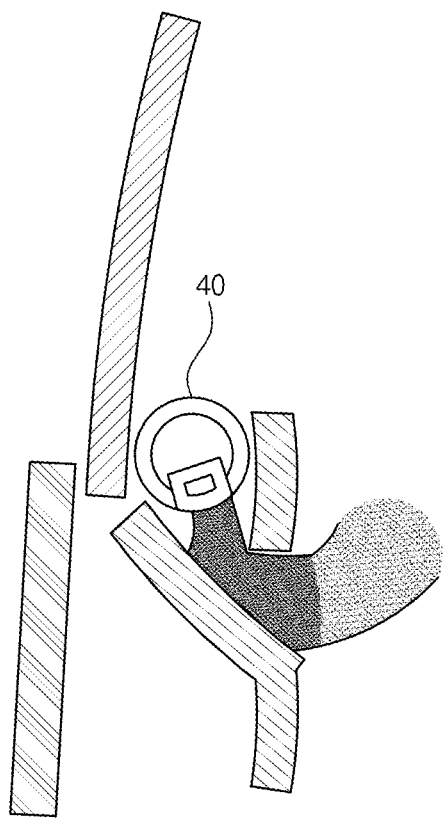
FIG. 5C is a third exemplary diagram illustrating an operation state of an actuator included in a device for controlling emotional lighting of a vehicle according to an embodiment of the present disclosure.

FIG. 5C is a third exemplary diagram illustrating an operation state of an actuator included in a device for controlling emotional lighting of a vehicle according to an embodiment of the present disclosure.

As shown in FIG. 5C, when the user sets the mood mode through the setting device 20, the controller 60 may control the actuator 50 such that the irradiation direction of the emotional lighting 40 is directed toward a lower end of the interior of the vehicle. In this connection, the controller 60 may control the emotional lighting 40 to irradiate light of a color (e.g., light blue, light orange, and the like) giving a soft feeling. In addition, the controller 60 may also control the emotional lighting 40 to irradiate light of a color with high visibility (e.g., a color adjacent to external light on the color chip) in a situation in which the external light is strong (e.g., a daytime).

In one example, the controller 60 may control the mood mode in connection with the emotional mode. That is, the controller 60 may control the emotional lighting 40 to irradiate the light corresponding to the representative color in the emotional mode to the lower end of the interior of the vehicle.

Figure 5D:
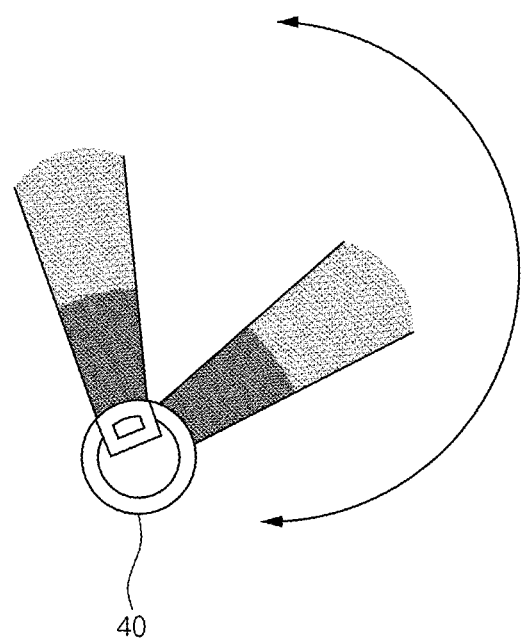
FIG. 5D is a fourth exemplary diagram illustrating an operation state of an actuator included in a device for controlling emotional lighting of a vehicle according to an embodiment of the present disclosure.

FIG. 5D is a fourth exemplary diagram illustrating an operation state of an actuator included in a device for controlling emotional lighting of a vehicle according to an embodiment of the present disclosure.

As shown in FIG. 5D, when the user sets the music mode through the setting device 20, the controller 60 may control the actuator 50 such that the light of the emotional lighting 40 reciprocates a predetermined section in accordance with the music output through the AVN system 300. In this connection, the controller 60 may control the emotional lighting 40 to flash in a plurality of loud colors (e.g., the red, green, and blue).

Figure 6:
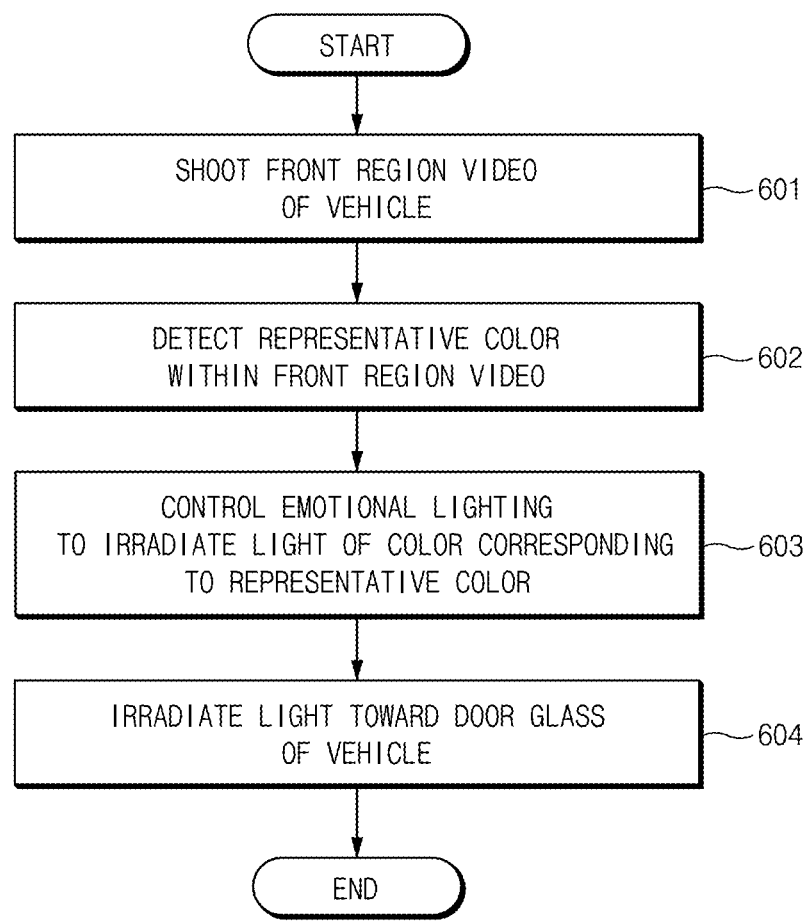
FIG. 6 is a flowchart of a method for controlling emotional lighting of a vehicle according to an embodiment of the present disclosure.

FIG. 6 is a flowchart of a method for controlling emotional lighting of a vehicle according to an embodiment of the present disclosure.

First, the camera 30 shoots the front region video of the vehicle (601).

Thereafter, the controller 60 detects the representative color within the front region video (602).

Thereafter, the controller 60 controls the emotional lighting 40 to irradiate the light of the color corresponding to the representative color (603).

Thereafter, the emotional lighting 40 irradiates the light toward the door glass of the vehicle (604).

Figure 7:
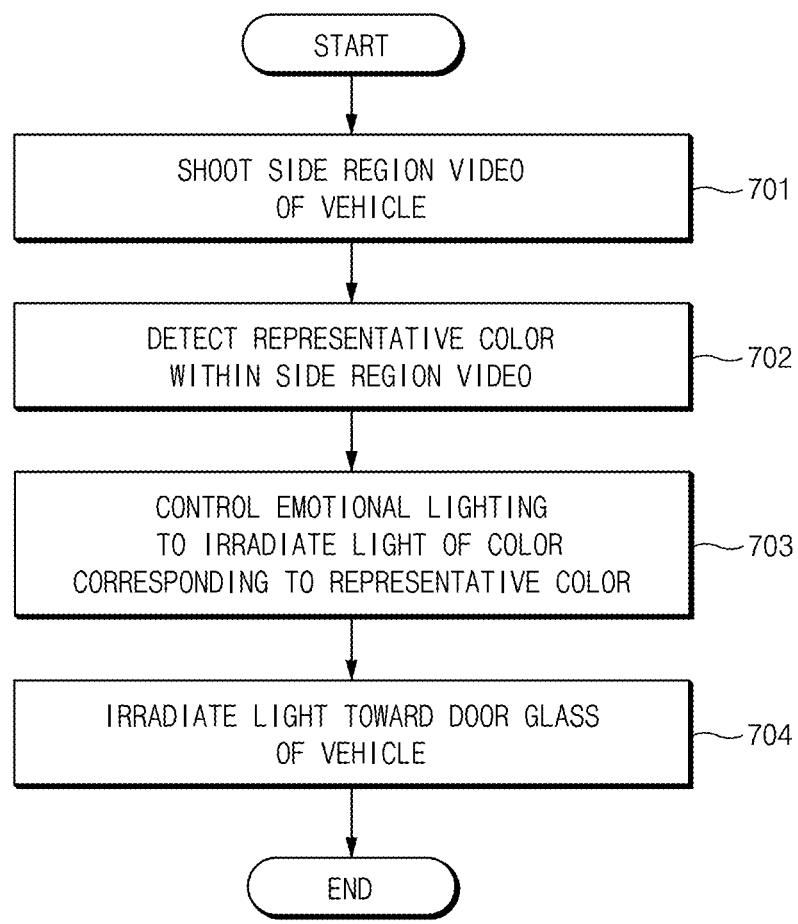
FIG. 7 is a flowchart of a method for controlling emotional lighting of a vehicle according to another embodiment of the present disclosure.

FIG. 7 is a flowchart of a method for controlling emotional lighting of a vehicle according to another embodiment of the present disclosure.

First, the camera 30 shoots the side region video of the vehicle (701).

Thereafter, the controller 60 detects the representative color within the side region video (702).

Thereafter, the controller 60 controls the emotional lighting 40 to irradiate the light of the color corresponding to the representative color (703).

Thereafter, the emotional lighting 40 irradiates the light toward the door glass of the vehicle (704).

Figure 8:
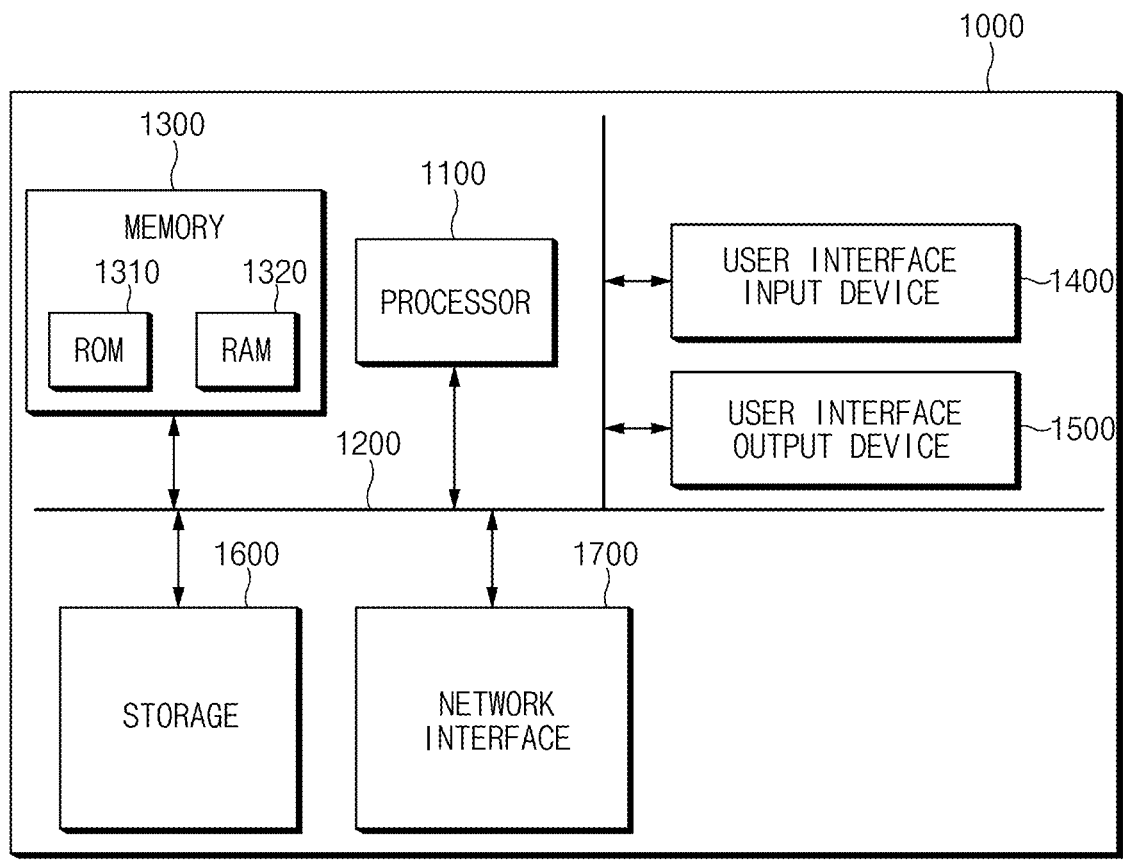
FIG. 8 is a block diagram illustrating a computing system for executing a method for controlling emotional lighting of a vehicle according to an embodiment of the present disclosure.

FIG. 8 is a block diagram illustrating a computing system for executing a method for controlling emotional lighting of a vehicle according to an embodiment of the present disclosure.

Referring to FIG. 8, the method for controlling the emotional lighting of the vehicle according to each embodiment of the present disclosure described above may be implemented through a computing system. A computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a solid state drive (SSD), a removable disk, and a CD-ROM. The exemplary storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure.

Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

The device and the method for controlling the emotional lighting of the vehicle according to an embodiment of the present disclosure as described above may shoot the video of the surrounding region using the camera included in the vehicle, detect the representative color within the video of the surrounding region, and irradiate the light of the color corresponding to the representative color to the door glass of the vehicle, thereby allowing the driver and the passenger of the vehicle to emotionally view the external landscape through the door glass.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A device for controlling emotional lighting of a vehicle, the device comprising:
   a camera configured to record a video of a surrounding region of the vehicle; and
   an emotional lighting device for irradiating light toward a door glass of the vehicle;
   an actuator for adjusting an irradiation direction of the emotional lighting device; and
   a controller configured to:
      control the emotional lighting device to detect a representative color within the video of the surrounding region, and
      irradiate light of a color corresponding to the representative color,
      wherein, when a warning signal is inputted from a warning system included in the vehicle, the controller is further configured to:
      control the actuator such that the irradiation direction is directed toward an upper end of an interior of the vehicle, and
      control the emotional lighting device to irradiate light of a color corresponding to the warning signal.

2. The device of claim 1, wherein the controller is further configured to acquire vehicle speed information through a vehicle network.

3. The device of claim 2, wherein the controller is further configured to determine a time point of irradiation of the emotional lighting device based on the vehicle speed information.

4. The device of claim 2, wherein the controller is configured to detect the representative color from a side region video of the video of the surrounding region when the vehicle is stopped.

5. The device of claim 2, wherein the controller is configured to detect the representative color from a front region video of the video of the surrounding region when the vehicle is moving.

6. The device of claim 5, wherein the controller is configured to:
determine a region of interest (ROI) within the front region video based on the vehicle speed information, and
detect the representative color within the ROI.

7. The device of claim 6, wherein the controller is configured to detect a color with a highest occupancy ratio within the ROI as the representative color.

8. The device of claim 6, wherein the controller is configured to:
detect a portion of a left region of the front region video as the ROI when providing an emotional landscape to a first passenger on a left side of the vehicle, and
detect a portion of a right region of the front region video as the ROI when providing the emotional landscape to a second passenger on a right side of the vehicle.

9. The device of claim 1, further comprising:
a setting device configured to receive setting on an operation mode from a user.

10. The device of claim 9, wherein the controller is further configured to:
control the actuator such that the irradiation direction is directed toward a lower end of the interior of the vehicle when a mood mode is set through the setting device, and
control the emotional lighting device to irradiate light of a color corresponding to the mood mode.

11. The device of claim 9, wherein the controller is further configured to:
control the actuator such that light of the emotional lighting device reciprocates a predetermined section when a music mode is set through the setting device, and
control the emotional lighting device to irradiate light of a color corresponding to the music mode.

12. A method for controlling emotional lighting of a vehicle, the method comprising:
recording, by a camera, a front region video of the vehicle;
detecting, by a controller, a representative color within the front region video;
controlling, by the controller, an emotional lighting device to irradiate light of a color corresponding to the representative color;
irradiating, by the emotional lighting device, the light toward a door glass of the vehicle; and
when a warning signal is input from a warning system included in the vehicle, adjusting, by the controller, an irradiation direction of the emotional lighting device to an upper end of an interior of the vehicle, and controlling the emotional lighting device to irradiate light of a color corresponding to the warning signal.

13. The method of claim 12, wherein the detecting of the representative color includes:
determining a region of interest (ROI) in the front region video based on a vehicle speed; and
detecting a color with a highest occupancy ratio within the ROI as the representative color.

14. The method of claim 13, wherein the determining of the ROI includes:
determining a portion of a left region of the front region video as the ROI when providing an emotional landscape to a first passenger on a left side of the vehicle; and
determining a portion of a right region of the front region video as the ROI when providing the emotional landscape to a second passenger on a right side of the vehicle.

15. The method of claim 12, wherein the controlling of the emotional lighting device includes determining a time point of irradiation of the emotional lighting device based on a vehicle speed.

16. The method of claim 12, further comprising:
adjusting, by the controller, the irradiation direction of the emotional lighting device to a lower end of the interior of the vehicle when a mood mode is set by a user, and controlling the emotional lighting device to irradiate light of a color corresponding to the mood mode; and
adjusting, by the controller, the light of the emotional lighting device to reciprocate a predetermined section when a music mode is set by the user, and controlling the emotional lighting device to irradiate light of a color corresponding to the music mode.

17. A method for controlling emotional lighting of a vehicle, the method comprising:
recording, by a camera, a side region video of the vehicle;
detecting, by a controller, a representative color within the side region video;
controlling, by the controller, an emotional lighting device to irradiate light of a color corresponding to the representative color;
irradiating, by the emotional lighting device, the light toward a door glass of the vehicle; and
when a warning signal is input from a warning system included in the vehicle, adjusting, by the controller, an irradiation direction of the emotional lighting device to an upper end of an interior of the vehicle, and controlling the emotional lighting device to irradiate light of a color corresponding to the warning signal.

18. The method of claim 17, further comprising:
adjusting, by the controller, the irradiation direction to a lower end of the interior of the vehicle when a mood mode is set by a user, and controlling the emotional lighting device to irradiate light of a color corresponding to the mood mode; and
adjusting, by the controller, the light of the emotional lighting device to reciprocate a predetermined section when a music mode is set by the user, and controlling the emotional lighting to irradiate light of a color corresponding to the music mode.

* * * * *